E. F. GALLAUDET.
SYSTEM OF AERIAL CONTROL.
APPLICATION FILED APR. 30, 1910.
1,074,256.
Patented Sept. 30, 1913.
5 SHEETS—SHEET 1.
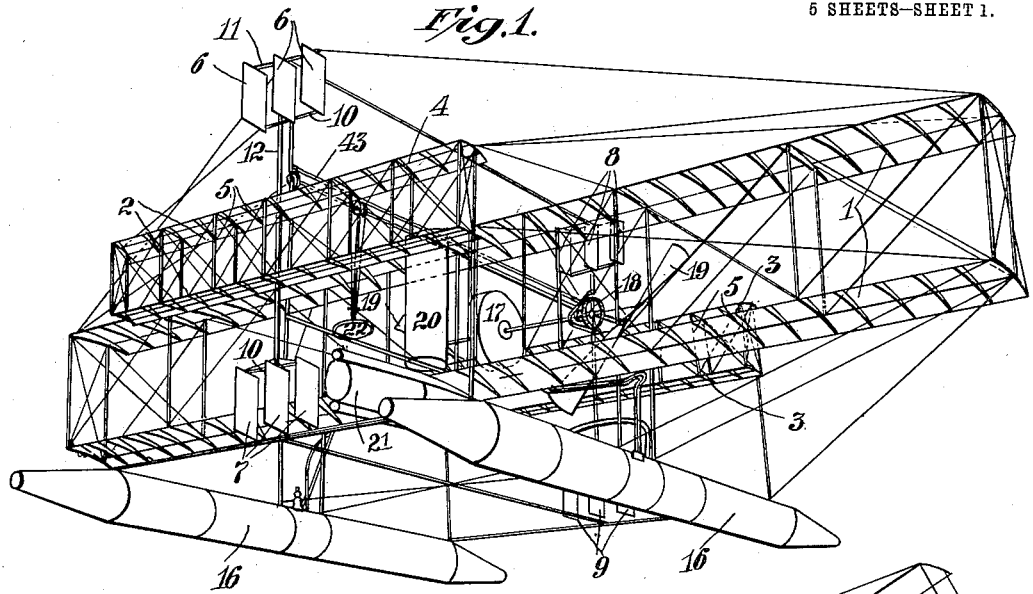
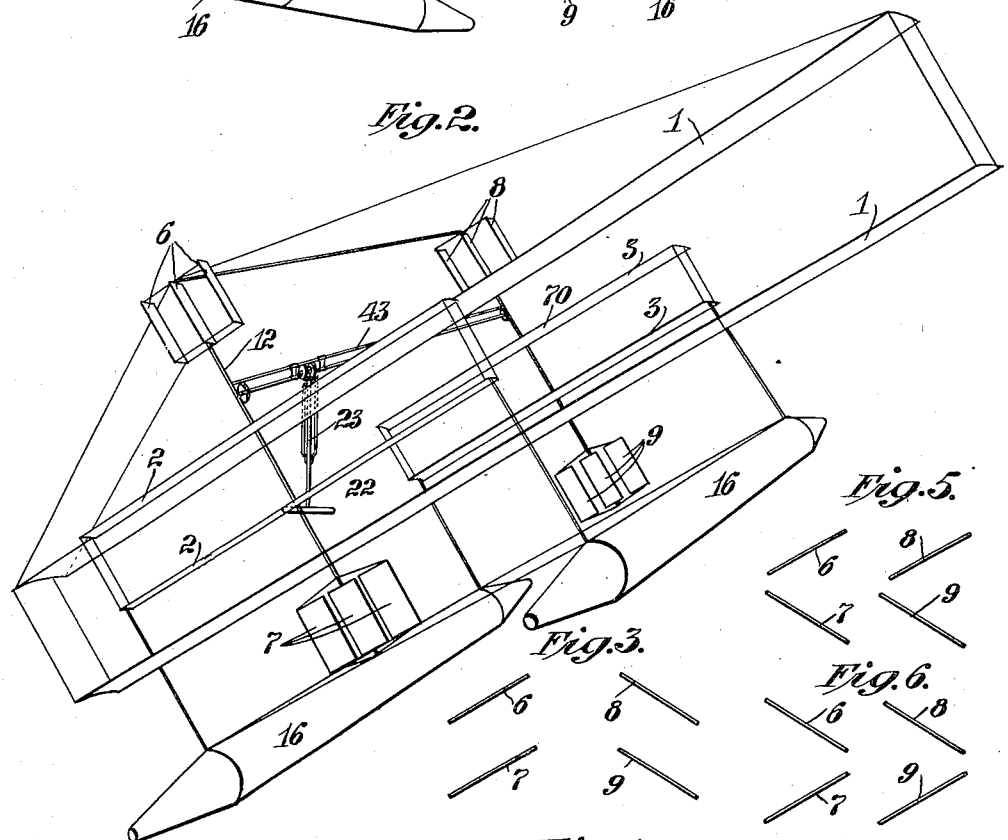

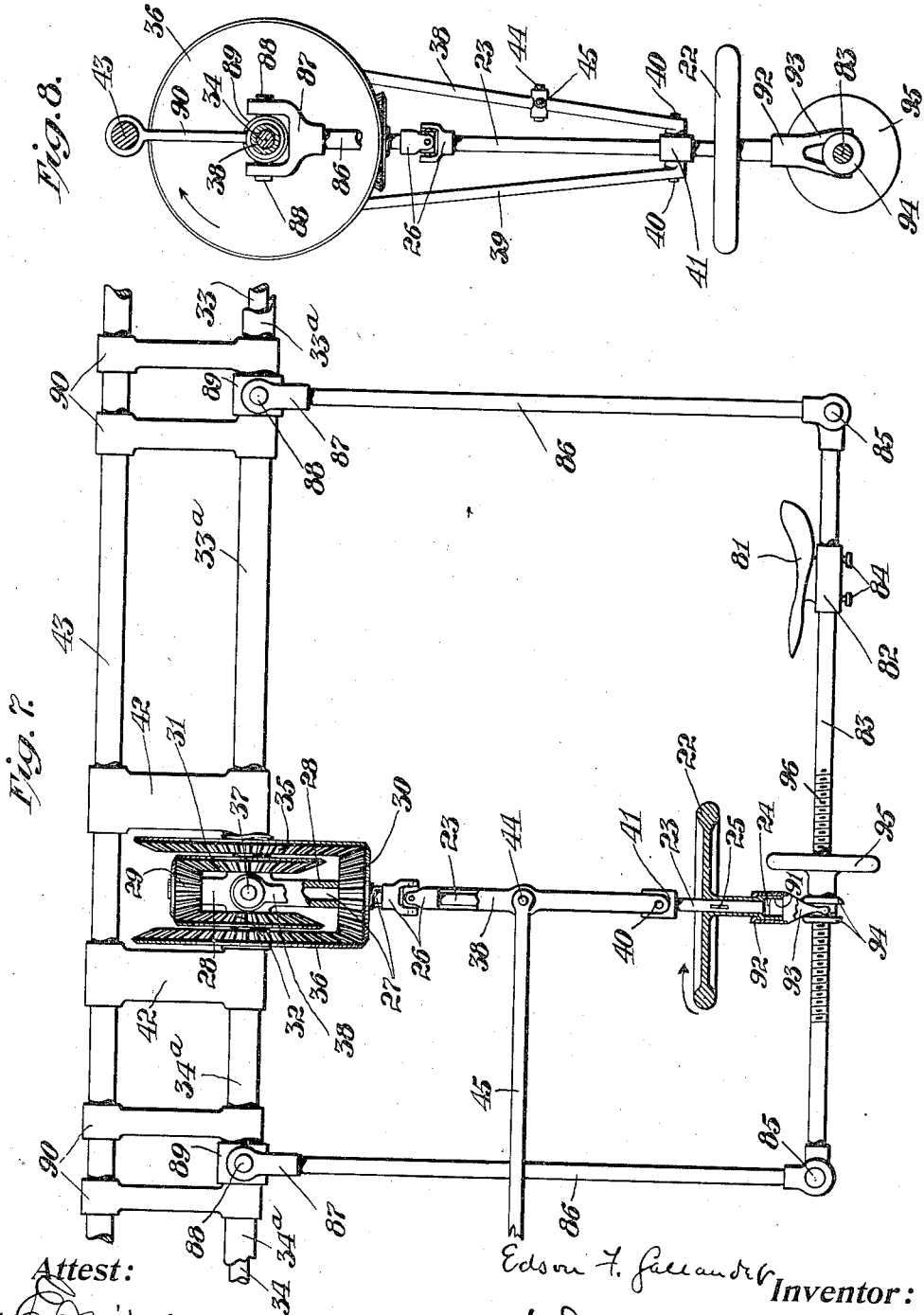

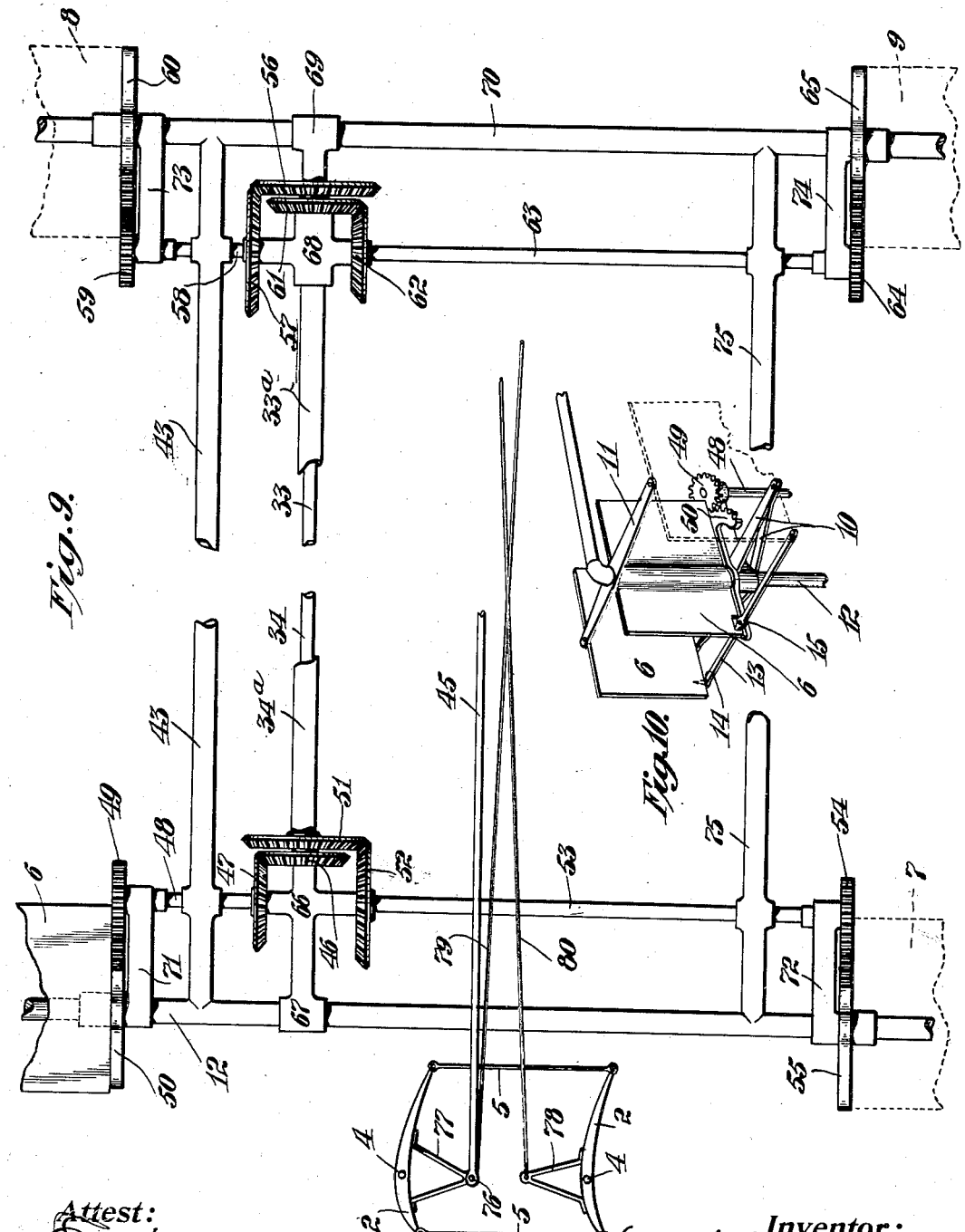

E. F. GALLAUDET.
SYSTEM OF AERIAL CONTROL.
APPLICATION FILED APR. 30, 1910.
1,074,256.
Patented Sept. 30, 1913.
5 SHEETS—SHEET 4.
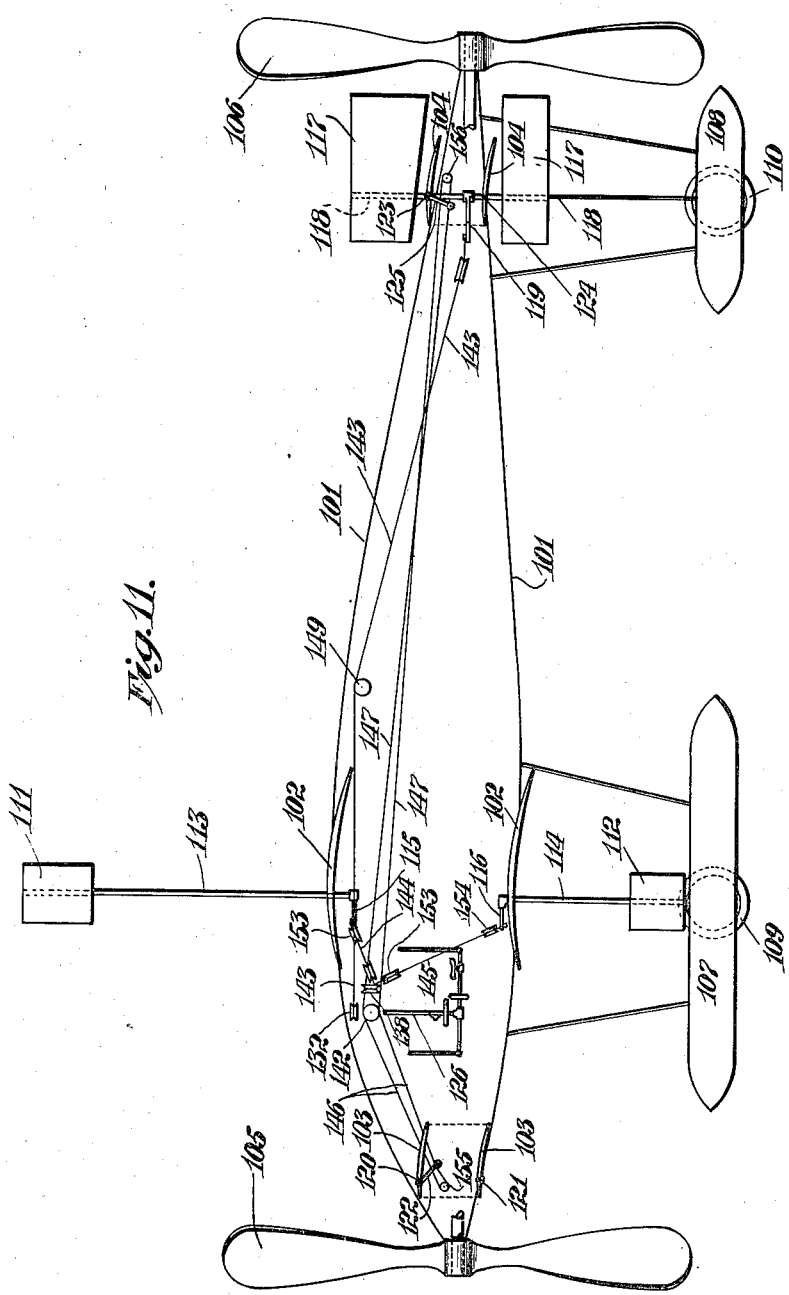

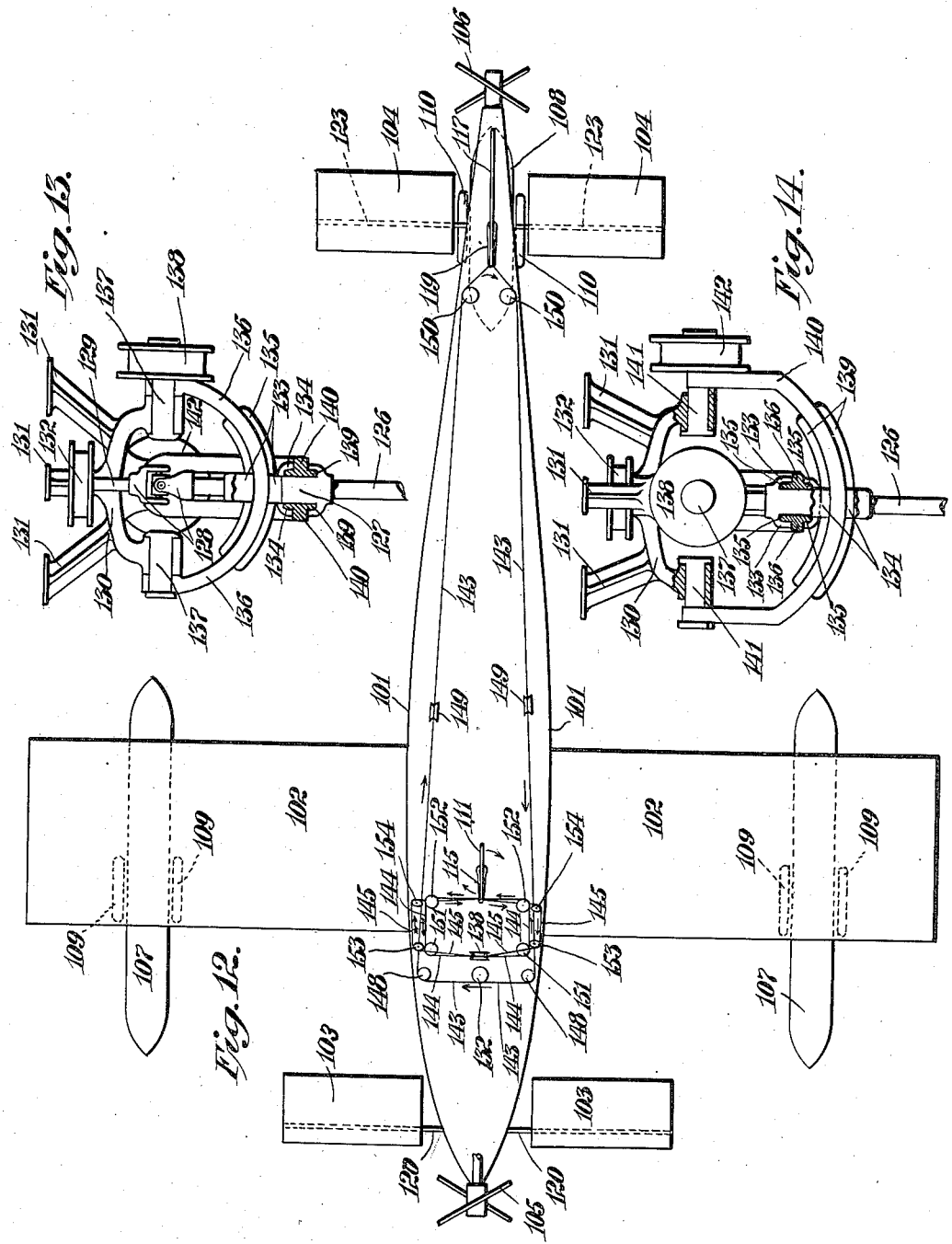

UNITED STATES PATENT OFFICE.

EDSON F. GALLAUDET, OF NORWICH, CONNECTICUT.

SYSTEM OF AERIAL CONTROL.

1,074,256.　　　　Specification of Letters Patent.　　Patented Sept. 30, 1913.

Application filed April 30, 1910. Serial No. 558,677.

*To all whom it may concern:*

Be it known that I, EDSON F. GALLAUDET, a citizen of the United States, and resident of the city of Norwich, in the county of New London and State of Connecticut, have invented a certain new and useful System of Aerial Control, of which the following is a specification.

My invention relates to a system of control primarily for aeroplanes, although it is applicable in whole or in part to other types of flying-machines and to air-ships such, for example, as dirigible balloons.

The object of the invention is to provide improved means and methods for securing and maintaining the lateral balance of aeroplanes and, further, to provide a complete system of control whereby such aerial machines will not only be maintained in lateral and longitudinal equilibrium automatically, subject to a dominating control on the part of the operator, but may also be steered both vertically and horizontally in any desired direction.

To this end the invention consists, broadly stated, in the employment of rudders (which term is used herein to designate vertically disposed planes mounted to rotate on vertical axes) for lateral balancing and horizontal steering, and of gradients (or horizontally disposed curved or flat surfaces mounted to rotate on transverse horizontal axes) for longitudinal balancing and vertical steering, and, also, in novel operating or controlling mechanism which, if left to itself, will automatically operate both rudders and gradients to maintain the machine in lateral and longitudinal balance; but may be actuated by the operator at will to anticipate, control, or accentuate its automatic action and also to direct the machine up or down and to port or starboard as he may desire.

Two gradients, each comprising either a single curved or flat plane or two or more parallel planes linked to move together, are preferably employed, one being mounted at the front and the other at the rear of the machine at substantially equal distances from its lateral axis, although a single gradient mounted either at the front or rear may be used. The machine is kept in longitudinal balance and steered either up or down by moving the single gradient up or down around its horizontal axis, as required, or, when both front and rear gradients are used, by moving one up or down and moving the other in the opposite direction, the forward movement of the machine thus producing a couple around its lateral axis. These gradients serve also as supporting surfaces and, when two are used, may constitute the main or sole means for supporting the machine in the air.

The balancing rudders also comprise either a single flat blade or two or more parallel blades linked to move together. A single rudder may be used for the purpose, in which case it may be mounted either above or below the main supporting surface of the machine, as nearly as may be at its center of gravity, on a post of sufficient length to give the necessary leverage so that, when the rudder is turned to port or starboard, the forward motion of the machine through the air will cause a lateral pressure thereon which will carry the top or bottom of the machine, as the case may be, to starboard or port. I prefer, however, to use these rudders in pairs mounted one above and the other below the supporting surface of the machine, either a single pair located at its center of gravity or, still more preferably, two pairs mounted on the longitudinal center of the machine, one forward and the other aft at equal distances from its lateral axis, thus producing, when the machine is moving forward and the upper rudders are turned together in one direction and the lower rudders in the opposite direction, a couple which will cause the machine to rotate on its longitudinal axis either to tilt it over to one side or to restore it to normal horizontal position when tilted, as required. If a single balancing rudder, or a single pair of such rudders, is used, a separate and independent rudder, which may be mounted in the ordinary manner either at the front or rear of the machine, is employed for steering; but when two pairs of rudders are employed, as stated, they will serve both for balancing and steering, as by turning both upper and lower front rudders slightly to one side or the other and both upper and lower rear rudders in the opposite direction a couple will be produced around its vertical axis which will cause the machine to turn horizontally to port or starboard, as the case may be.

The single steering wheel which with suitable connections I employ to impart all the required movements both to the gradients and rudders constitutes a distinct feature of my invention. This wheel is mounted immediately in front of the operator's seat at the lower end of a vertically disposed shaft which is provided above with a universal joint so that both shaft and wheel are free to swing forward and backward and to either side by gravity. The shaft is operatively connected with the gradients so that a forward or backward movement of the wheel will cause a rocking movement of the single gradient, or, where there are two gradients, will cause them both to rock equally but in opposite directions; while, acting through trains of gears and shafting, sheaves and cables, or other equivalent connecting mechanism, a side movement of the shaft and wheel will cause a movement of the upper balancing rudder or rudders in one direction and of the lower balancing rudder or rudders in the opposite direction, and the axial rotation of the wheel will rotate the shaft and thereby turn the steering rudder, where an independent steering rudder is used, either to port or starboard, as the case may be, or, where two pairs of rudders are used both for balancing and steering, will turn both forward rudders to one side and both rear rudders to the opposite side. For example, when the wheel is pushed or swings forward, the gradients are rocked so that the machine is directed upwardly and, when the wheel is drawn or swings backward, are rocked so that the machine is directed downwardly; and, if the wheel is allowed to swing free or if the operator tries to steer the machine on a course that is dangerously steep, the weight of the wheel and parts attached thereto will cause it to swing back to its original position, thereby restoring the gradients to their normal position and bringing the machine back to a horizontal course. By rotating the steering wheel about its vertical axis the operator may give the forward rudders a rotation similar to that of the wheel and the rear rudders a corresponding rotation in the opposite direction, thus steering the machine horizontally, while a movement of the wheel to one side, or the swinging of the wheel by gravity whenever the machine is heeled over, will introduce angular differentials between the upper and lower rudders which will cause the whole machine to tilt in the same angular direction in which the wheel shaft has been moved so as to quickly restore the machine to its proper, normal alinement with the steering wheel shaft. And as the machine is brought back into alinement the wheel will swing to restore the gradients to their normal position and cause the angular differentials between the upper and lower rudders to disappear, the forces acting to balance the machine ceasing at the moment the restoration to alinement has been accomplished.

As a still further part of my invention, I mount the operator's seat upon a suspended frame which, like the steering wheel and shaft, is free to swing backward and forward and to either side by gravity, and I provide an adjustable and detachable connection between the swinging seat frame and the steering wheel shaft. Thus, the weight of the operator is utilized in the automatic operation of the balancing rudders and gradients to maintain the machine in both longitudinal and lateral equilibrium, while the operator can, by adjusting the connection of the steering wheel shaft forward or backward along the frame of the seat, keep the machine on a fixed course, either horizontal or upward or downward to any desired degree, or can release the connection and then move the wheel independently of the movement of the seat to anticipate, accentuate, or reverse its automatic action by gravity.

Two different types of aeroplanes, both embodying my invention and suitable for carrying into effect my method of balancing and steering, are illustrated in the accompanying drawings, in which similar reference numerals are used throughout to indicate like parts.

Figure 1 is a perspective view of a biplane flying-machine, showing all the parts thereof; Fig. 2, a diagrammatic view of the machine tilted to one side, showing the steering wheel and shaft hanging vertically and the upper and lower rudders in differential angular positions; Figs. 3, 4, 5, and 6, diagrams indicating the position of the upper and lower front and rear rudders when steering to port, when steering to starboard, when tilting the machine to port or overcoming a tilt to starboard, and when tilting the machine to starboard or overcoming a tilt to port, respectively; Fig. 7, a broken detailed side view of the steering mechanism and operator's seat, showing in part the shaft connections to the rudders and link connection to the forward gradient; Fig. 8, an end view, from the left, of the parts shown in Fig. 7, with portions of the frame for the operator's seat cut away; Fig. 9, a broken detailed side view of the rudders and forward gradient, showing the operative connections between the steering wheel differential gears and the rudders, the link connection to the forward gradient, and the cable connections from forward to rear gradient; Fig. 10, a broken detached view showing, in perspective, the construction of the upper forward rudder; Fig. 11, a diagrammatic side view, and Fig. 12, a similar plan view, of a monoplane flying-machine showing the application of my invention in a modified form; and Figs. 13 and 14, broken detailed side and rear views, respectively, partly in section, showing the construction of the steering mechanism indicated in Figs. 11 and 12.

Referring to the specific embodiment of the invention illustrated in Figs. 1 to 10 of the drawings, the main supporting planes or wings 1, forward gradient 2, and rear gradient 3 together provide the necessary supporting surfaces of the machine. The main planes 1 are rigidly constructed and covered with any suitable material, their frames being built up of parabolic ribs made by a flanging process from thin steel plate and assembled by being strung on steel tubes which form the backbone of the planes, and are separated by vertical posts and braced by criss-cross wires to form the well-known biplane truss. The gradients 2 and 3 are constructed in a similar manner, but each gradient plane is mounted so that it can rock on a central tubular shaft 4 which forms part of the main fixed framework of the machine and passes through circular openings at the widest part of each gradient rib (see Fig. 9). The edges of the two superposed planes of each gradient are kept equidistant by hinged links 5 so that each pair will be rocked together and always remain parallel.

The steering and balancing rudders, each comprising three rudder blades or elements, are four in number, an upper forward rudder 6, lower forward rudder 7, upper rear rudder 8, and lower rear rudder 9. Their construction is shown by the perspective view of the upper forward rudder in Fig. 10. Each rudder blade is made of two thin sheets of steel soldered together at their front and rear edges and slightly sprung apart along their centers. The rudder frame consists of a steel yoke 10 and a steel cross-tie 11 mounted on the central vertical post 12 which forms the foremost perpendicular or stem of the machine. The middle blade of the rudder is slipped over this post and the side blades are slipped over side posts which connect the ends of the yoke 10 and cross-tie 11, with sufficient clearance at top and bottom to allow free turning, small spacers being soldered into the tops of all three blades and to the bottoms of the two side blades to form a bearing for turning on the posts. The middle blade is soldered at its bottom to the quadrant 50, which will be described hereafter. All three blades are connected together by a link-bar 13 fastened to the bottoms of the outer blades by pins 14 and to the quadrant 50 by the pin 15 so that when the middle blade is turned the two outer blades are also turned to the same angle, all three blades acting as a single blade of substantially the same total surface.

The aeroplane is mounted on cigar-shaped floats 16 which allow starting from and alighting on water. As here shown, the aeroplane is equipped with a steam turbine motor 17, transmitting power through the bevel gears 18 to the twin propellers 19, steam being supplied to the turbine from the boiler 20 and after passing therethrough being exhausted into the condenser 21 where it is condensed for further use. The floats are provided with tanks for containing water and liquid fuel for the boiler, and the necessary pipes and pumps are provided for feeding the water and fuel to the boiler. These features, however, constitute a separate invention and need not be described here, since the aeroplane, so far as my present invention is concerned, may either be a simple gliding machine or may be propelled by any suitable motive power.

The steering wheel 22 is mounted on the main steering shaft 23 and normally rests on the shaft head 24, but is free to be raised a short distance on the shaft and is kept from turning thereon by a key 25 which is fixed in the shaft and slides in a key-way cut in the neck of the wheel. The steering shaft at its upper end is connected by a universal joint 26 to the lower end of a vertical shaft 27 which extends through and is journaled in the vertical arms of the cross 28 and is supported by the small bevel gear 29 mounted at its upper end to rotate therewith and bearing on the top of the cross. The gear 29 engages the two bevel gears 31 and 32, which are mounted on the ends of and rotate the horizontal shafts 33 and 34, respectively. A larger bevel gear 30, mounted on the shaft 27 near its lower end and just below the lower arm of the cross 28, engages two bevel gears 35 and 36 which are mounted to rotate the hollow horizontal shafts 33$^a$ and 34$^a$, respectively. The cross 28 carries horizontally projecting pins which extend into the hubs of the gears 31 and 32 and serve to keep them properly alined and in mesh with the gear 29, while the hubs of the gears 31 and 32 extend in turn into the hubs of the gears 35 and 36 and keep them alined and in mesh with the gear 30. The cross 28 is also provided with horizontal arms 37, at right angles to the shafts 33 and 34, the ends of which support link-bars 38 and 39 engaging at their lower ends the trunnions 40 of a collar 41 mounted on the steering shaft 23, a short distance above the steering wheel. This whole group of parts, 22 to 41 inclusive, is supported by the shaft-hangers 42 which are rigidly connected to the horizontal spar 43 of the main framework of the aeroplane. The shafts 34 and 34$^a$ extend forward and operate the forward upper and lower rudders 6 and 7, respectively, the former through the bevel gears 46 and 47, shaft 48, spur-pinion 49, and quadrant 50, and the latter through the bevel gears 51 and 52, shaft 53, spur-pinion 54, and quadrant 55; the four gears being supported and kept in alinement by the cross 66, supported by the ferrule 67 on the vertical stem-post 12, the arms of which terminate in pins extending into the hubs of the gears 46, 47, and 52, while the hub of the gear 46 extends in turn into the hub of the gear 51. The shafts 48 and 53 pass through and bear in bosses incorporated, respectively, with the horizontal spars 43 and 75 of the main framework. The spur-pinion 49 and quadrant 50 are supported and alined by the upper bracket 71, and the spur-pinion 54 and quadrant 55 by the lower bracket 72, both secured upon the stem-post 12. The shafts 33 and 33ª extend aft and, through the gears 56 and 57, shaft 58, spur-pinion 59, and quadrant 60 and the gears 61 and 62, shafts 63, spur-pinion 64, and quadrant 65, respectively operate the rear upper and lower rudders 8 and 9. The shaft 33 extends through the horizontal arms of the cross 68 and has an end bearing in the neck of the ferrule 69 secured on the vertical stern-post 70, and the shaft 33ª extends through the horizontal arms of the cross which form a hollow sleeve serving as a bearing for the hollow hub of the gear 61 which in turn serves as a bearing for the hub of the gear 56, while the hollow hubs of the gears 57 and 62 have bearings upon pins projecting from the vertical arms of the cross; the vertical shafts 58 and 63 bear in bosses incorporated with the horizontal spars 43 and 75, respectively; and the spur-pinion 59 and quadrant 60 are supported and alined by the upper bracket 73, and the spur-pinion 64 and quadrant 65 by the lower bracket 74, secured upon the stern-post 70. The forward and aft movement of the steering wheel is communicated to the forward gradient by means of the link-bar 45, which at its rear end is pivoted upon trunnions 44 mounted on the link 38 and at its forward end is pivoted by a pin 76 to a bracket 77 carried on one of the central ribs of the upper element of the forward gradient 2; and through the forward gradient to the rear gradient by means of the crossed cables 79 and 80, the former connecting the lower end of the bracket 76 with the upper end of a similar bracket (not shown) similarly mounted on the lower element of the rear gradient and the latter connecting the upper end of the bracket 78 mounted on the lower element of the forward gradient 2 with the lower end of a similar bracket (not shown) similarly mounted on the upper element of the rear gradient.

The balancing and steering operations are effected, through the movement and manipulation of the steering wheel, as follows: When the wheel is advanced, the forward gradient is tilted up and the rear gradient down, thus raising the bow and depressing the stern and directing the aeroplane on an upward course; and, whenever the wheel is swung forward by gravity by the dipping of the machine it will, after tilting the gradients, gradually swing back and restore them to their original position as the machine is brought back to its normal position. When the wheel is drawn or swings backward the movement of the gradients and the action of the aeroplane will be reversed. If, however, the steering wheel is moved or swings by gravity to one side, to port for example, the links 38 and 39, acting on the horizontal arms of the cross 28, will give a similar angular movement to the whole group of gears, 29, 30, 31, 32, 35 and 36, and will thus rock the shafts 33, 34, 33ª, and 34ª on their axes and give an angle of incidence to the port sides of both upper rudders and to the starboard sides of both lower rudders, thereby causing the machine to turn on its longitudinal axis until it has been brought back into alinement with the steering shaft, whereupon all four rudders will have been restored to their original positions. The axial rotation of the steering wheel, in the direction of the arrow, for instance, will turn the port sides of the two front rudders and the starboard sides of the two rear rudders to the wind and thereby carry the bow of the aeroplane to starboard and its stern to port. And whenever the steering wheel is simultaneously rotated and swung to one side or the other, the compounded resultant of the two separate movements will be communicated to each of the four rudders.

The operator's seat or saddle 81, suspended a little below and behind the steering wheel, is mounted on a sleeve 82 adjustably clamped to the horizontal bar 83 by set screws 84. The saddle bar is pivoted at each end by pins 85 to the lower ends of link-bars 86 which are suspended by means of the top yokes 87, trunnions 88, and trunnion sleeves 89 from the hanger brackets 90, which, in turn, are fixed upon and supported by the horizontal spar 43 and serve both as inside bearings for the trunnion sleeves and as outside bearings for the hollow shafts 33ª and 34ª. A shouldered collar 91 on the downwardly depending hub of the steering wheel supports the upper shouldered sleeve 92 of the fork 93, the prongs of which normally embrace and are loosely held between the collars 94 on the neck of the auxiliary gradient wheel 95 which is adjustably carried by screw-threads 96 on the saddle bar 83.

It is evident that an operator sitting on the saddle 81 is in a convenient position for steering the aeroplane horizontally by turning the steering wheel, and by drawing his body forward or by pushing it backward he can direct his machine either on an upward or downward course as desired. If the aeroplane is caused by the wind to pitch either up or down or to roll to one side, the force of gravity, acting through the weight of the operator's body, immediately restores it to its proper course along the desired grade and in a balanced position. If the operator turns the aeroplane horizontally around a sharp curve, the centrifugal force resulting from the motion along the curved path will swing his body toward the outside of the curve and will thereby cause the aeroplane to heel over toward the inside of the curve until its fixed vertical members are brought into parallelism with the resultant of the horizontal centrifugal force and the vertical force of gravity. The operator may, if he wishes, anticipate the effect of the centrifugal force set up in rounding a curve, and begin to heel the machine over either by leaning his body toward the side to which he intends to turn the machine or by moving his saddle slightly toward the outside by pushing with his feet on the floor of the car. And if the operator desires entire freedom in the manipulation of the steering wheel, whether in starting or alighting or for any other reason, he can lift the wheel so as to disengage it from the frame of his saddle and, screwing the auxiliary gradient wheel out of the way, can then manipulate it freely as he may desire. On again connecting the wheel with the saddle-bar, by reëngaging the fork at its lower end with the collars of the gradient wheel, the operator may so adjust the gradient wheel that, while momentary disturbances of his course are taken care of by the automatic functioning of the mechanism, the machine will maintain an average course either horizontal or upward or downward to any desired degree.

In the modified form of the invention illustrated in Figs. 11 to 14, the aeroplane has a torpedo-shaped body 101 which is supported by the main planes 102, front gradient 103 and rear gradient 104, and is propelled by the bow propeller 105 and stern propeller 106 which are designed to be driven in opposite directions and by any suitable motor. Two main floats 107 are placed under the main wings and a third float 108 is placed under the rear end of the body, a pair of wheels 109 being incorporated with each of the main floats and a third pair 110 with the rear float, thereby permitting the aeroplane to start and alight either on land or water. Provision for the lateral balancing of the machine is here made by the single upper rudder 111 and single lower rudder 112, respectively mounted to rotate with posts 113 and 114, carrying tillers 115 and 116 at their lower and upper ends respectively, just inside the body of the aeroplane. As these rudders are used for balancing only, provision is made for horizontal steering by means of the double rudder 117 the elements of which, one above and the other below the aeroplane body, are mounted to rotate with the vertical rudder-post 118 having a tiller 119 secured thereto inside the body. The upper and lower elements of the forward gradient 103 are mounted, the former to rotate with the upper spar 120 which is journaled in supports incorporated with the aeroplane body and carries the tiller 122, and the latter to rotate upon the lower fixed spar 121, and their edges are kept equidistant from each other by pivoted link-bars (indicated only by dotted lines). The upper and lower elements of the rear gradient 104 are mounted in a similar manner on an upper rotatable spar 123 and lower fixed spar 124, respectively, the two being kept parallel by pivoted link-bars and rocked by means of the tiller 125 fixed upon the upper spar. The controlling and steering mechanism comprises a steering wheel, an operator's saddle mounted upon a suspended frame, and an auxiliary or grade adjusting wheel to which the hub of the steering wheel is detachably connected, as heretofore described with reference to the biplane machine illustrated in Figs. 1 to 10. The steering wheel shaft 126, however, is here mounted in a different way and the movement thereof is transmitted to the rudders and gradients by an entirely different mechanism. The steering shaft extends upwardly through a neat but loosely fitting bearing in the cross-head block 127 and is connected by a universal joint 128 to the lower end of a short vertical shaft 129, which is journaled in a bracket casting 130 secured to the roof of the aeroplane car by four cast legs 131 and is supported therein by the sheave 132 mounted upon its upper end and bearing on the top of the bracket casting. The cross-head block 127 is provided with curved upper double guide-lugs 133 and lower double guide-lugs 134 which extend at right angles to each other. The upper guide-lugs 133 slide upon flanges 135 of the double quadrant 136 which is pivoted to the bracket casting by pins 137 extending horizontally fore and aft and having their axes coincident with the geometrical center of the universal joint 128. The lower guide-lugs 134 of the cross-head block slide upon flanges 139 of the double quadrant 140 which is pivoted to the bracket casting by pins 141 extending transversely of the body of the aeroplane, at right angles to the pins 137, and with axes also coincident with the geometrical center of the universal joint. The curvature of both quadrants and of the upper and lower guide-lugs is that of a circle described about the center of the universal joint. The sheaves 138 and 142 are respectively mounted upon to rotate with the rear end of the quadrant 136 and the starboard end of the quadrant 140, with axes coincident with the axes of the pins 137 and 142, respectively. The sheave 132 is connected with the tiller 119 and controls the steering rudder 117 by cables 143 carried, on each side of the aeroplane body, upon idler sheaves 148, 149 and 150. The sheave 138 is connected with the tiller 115 operating the upper balancing rudder 111 by the cables 144 which lead from the lower side of the sheave to each side of the tiller over the idler sheave 151 and 152 and is connected with the tiller 116 of the lower balancing rudder 112 by similar cables 145 carried over the idler sheaves 153 and 154. The sheave 142 is connected with the tiller 122 of the forward gradient by the cable 146, which passes from the sheave to and around the idler sheave 155 and acts as a direct continuous belt to the lower or return part of which the tiller is secured, and is connected with the tiller 125 of the rear gradient by the crossed cable 147, which extends to and around the idler sheave 156 and acts as a crossed continuous belt with the part leading from the top of the sheave 142 connected to the tiller. The manipulation required for steering and balancing is precisely the same in this machine as in that first above described. Thus, an axial rotation of the steering wheel causes the rear steering rudders to rotate in the same direction and to the same extent. The forward movement of the wheel will cause a tilting movement of the forward gradient upwardly and of the rear gradient downwardly, and a backward movement of the wheel will cause a reversal of these tilting movements. And a side movement of the wheel, say to port, will draw the cables 144 and 145 in the direction shown by the arrows (see Fig. 12) and cause the upper balancing rudder to present an angle of incidence on its port side and the lower balancing rudder on its starboard side.

While I have described my invention and have explained its principle with particular reference to the specific forms of its embodiment illustrated in the drawings, it is to be understood that it is applicable to other types of flying-machines and air-ships and that it may be variously and widely modified in its details, as by changing the number, form, arrangement, and connections of the several parts, by substituting equivalents therefor, or by omitting some of the parts entirely, without departing from the spirit or sacrificing the advantages thereof.

What I claim as new and desire to secure by Letters Patent, is:

1. In a flying machine, the combination of movable surfaces adapted to cause the tilting of the machine when in flight around both its longitudinal and transverse axes, a seat for the operator suspended from the frame of the machine so as to swing as a pendulum forward and aft and transversely, and operative connections, including a vertically disposed steering shaft detachably connected to the seat and adapted to swing therewith, between the seat and the movable surfaces whereby a change from the normal in the position of the seat relative to the machine will cause the movable surfaces to so move as to tilt the machine and restore the seat to normal position relative thereto.

2. In a flying machine, the combination of a movable surface or surfaces adapted to cause the transverse tilting of the machine when in flight around its longitudinal axis, a seat for the operator suspended from the frame of the machine and free to swing as a pendulum transversely thereto, and operative connections, including a vertically disposed steering shaft detachably connected with the seat and adapted to swing therewith, between the seat and the movable surfaces whereby a change from the normal in the position of the seat relative to the machine will cause the movable surfaces to so move as to tilt the machine and restore the seat to normal position relative thereto.

3. In a flying-machine, the combination with an aeroplane of rudders mounted in pairs one above and the other below said aeroplane both forward and aft and means for simultaneously turning said upper rudders in one direction and said lower rudders in the opposite direction.

4. In a flying-machine, the combination with an aeroplane of rudders mounted in pairs one above and the other below said aeroplane both forward and aft, means for simultaneously turning said forward rudders in one direction and said rear rudders in the opposite direction and means for simultaneously turning said upper rudders in one direction and said lower rudders in the opposite direction, said means being operable either separately or together.

5. In a flying-machine, rudders mounted in pairs one above and the other below the plane of the sustaining surface of the machine and at its center, one pair forward and the other aft at substantially equal distances from the lateral center of the machine, and means for causing said rudders both upper and lower to turn so as to simultaneously present compression surfaces on the sides thereof which are nearest the horizontal plane through the longitudinal axis of the machine.

6. In a flying-machine, the combination with an aeroplane of fore and aft gradients, fore and aft rudders mounted in pairs one above and the other below said aeroplane at its longitudinal center, a steering wheel, and means whereby the forward and aft movement of said wheel will cause a differential movement of the gradients in one direction or the other according to the direction in which the wheel is moved, a lateral movement of said wheel to one side or the other will cause a movement of the upper rudders in one direction or the other and an opposite movement of the lower rudders according as the wheel is swung to port or starboard, and the rotation of said wheel will cause the forward rudders to turn together in one direction and the rear rudders to turn together in the opposite direction according to the direction in which the wheel is rotated.

7. In a system of aerial control, the combination with a steering wheel mounted on a vertically disposed shaft swinging freely in all directions, of a suspension frame carrying a seat for the operator and also swinging freely in all directions and means adapted at the will of the operator to impart the movement of said suspended frame to the shaft of said steering wheel.

8. In an aerial machine, the combination with front and rear gradients and upper and lower balancing and steering rudders, of a steering wheel and operative connections whereby the rotation of the wheel will operate said rudders to steer the machine to port or starboard, the forward and aft movement of the wheel will operate said gradients to steer the machine vertically and the lateral movement of said wheel will operate said rudders to maintain the lateral balance.

9. In a system of aerial control, the combination with gradients for maintaining longitudinal balance and for vertical steering and rudders for maintaining lateral balance and for horizontal steering, of a steering wheel mounted on a vertically disposed shaft swinging freely in all directions, means for communicating the forward and aft movement of said steering wheel to said gradients, means for communicating the lateral movement of said steering wheel to the balancing rudders, and means for communicating a rotating movement of said steering wheel to the steering rudders.

10. In a system of aerial control, the combination with a steering wheel mounted on a vertically disposed shaft capable of swinging freely in all directions, of a seat for the operator mounted upon a suspended frame also swinging freely in all directions and means detachably connecting the shaft of said steering wheel with the said suspended frame so that the operator's seat and the steering wheel will move together or may be moved independently of one another.

11. In a system of aerial control, the combination with a steering wheel mounted upon a shaft freely swinging in all directions, of a seat for the operator mounted upon a suspended frame swinging freely in all directions, means detachably connecting the shaft of the steering wheel with the frame supporting the operator's seat, and means for adjusting the said connection forward and aft with respect to the said supporting frame.

12. In a system of aerial control, the combination with a steering wheel mounted upon a shaft capable of swinging freely in all directions, of a seat for the operator mounted upon a suspended frame also capable of swinging freely in all directions, and means detachably connecting the said shaft of the steering wheel with the said suspended frame whereby the movement of the operator's seat may be communicated to the steering wheel or the steering wheel may be moved independently of the movement of the operator's seat as desired.

13. In a system of aerial control, the combination with a steering wheel mounted on a vertically disposed shaft and a seat for the operator both free to swing by gravity in any direction, of a connection between said seat and shaft so that both will move together, means for regulating the forward and aft position of said connection, and means for detaching said connection so that said wheel may be moved independently of said seat.

14. In a system of aerial control, the combination with one or more gradients and balancing and steering rudders of a steering wheel shaft provided with a universal joint so that the end carrying the steering wheel is capable of movement in all directions, a sheave mounted to rotate with the axial rotation of said shaft and operatively connected with said steering rudders, a second sheave mounted to rotate with the movement of said shaft in one plane and operatively connected with said gradients; and a third sheave mounted to rotate with the movement of said shaft in a plane at right angles to the first plane and operatively connected with said balancing rudders.

In witness whereof I have hereunto signed my name in the presence of two witnesses.

EDSON F. GALLAUDET.

Witnesses:
W. E. DWIGHT,
GEORGE F. HOAGLAND.